(12) United States Patent
Auran et al.

(10) Patent No.: US 6,241,526 B1
(45) Date of Patent: Jun. 5, 2001

(54) TRAINING DEVICE PREFERABLY FOR IMPROVING A PHYSICIAN'S PERFORMANCE IN TYMPANOCENTESIS MEDICAL PROCEDURES

(75) Inventors: Mitchell Auran, Boca Raton; Steven Stull, Boynton Beach, both of FL (US); Michael Pichichero, Rochester, NY (US)

(73) Assignee: Outcomes Management Educational Workshops, Inc., Boynton Beach, FL (US)

( * ) Notice: Subject to any disclaimer, the term of this patent is extended or adjusted under 35 U.S.C. 154(b) by 0 days.

(21) Appl. No.: 09/483,732

(22) Filed: Jan. 14, 2000

(51) Int. Cl.[7] .................................................. G09B 23/28
(52) U.S. Cl. .......................... 434/270; 434/262; 434/365; 434/433
(58) Field of Search .................................. 434/270, 262, 434/365, 433

(56) References Cited

U.S. PATENT DOCUMENTS

| | | | |
|---|---|---|---|
| 2,778,125 | * | 1/1957 | Hantman . |
| 3,757,463 | * | 9/1973 | Breslow et al. . |
| 4,308,426 | * | 12/1981 | Kikuchi et al. . |
| 4,586,194 | * | 4/1986 | Kohashi et al. ........................ 381/60 |
| 5,674,196 | * | 10/1997 | Donaldson et al. .................... 604/93 |
| 5,851,177 | * | 12/1998 | Koch ..................................... 600/206 |
| 5,997,307 | * | 12/1999 | LeJeune, Jr. ......................... 434/262 |

* cited by examiner

Primary Examiner—Sam Rimell
Assistant Examiner—Bena B. Miller
(74) Attorney, Agent, or Firm—Malin, Haley & DiMaggio, P.A.

(57) ABSTRACT

A device for training physicians in tympanocentesis is disclosed. The device includes an outer member resembling a side profile of a child's head and shoulder's area. The outer member is attached to a surface portion to define a receiving area for receiving a slidable inner member. A replica of at least an eardrum and ear canal of a child's inner ear is associated with the sliding inner member. A training portion of the inner member supports a simulated inner ear, positions the simulated inner ear to a desired position adjacent the outer ear of the outer member, and acts as a holder for the training cartridges used with the training device. The cartridges simulate the "look and feel" of popping through the tympanic membrane. The cartridges include one or more training areas. Two color distinct training materials are maintained within each training area of the top member of the cartridge. The first training material represents a desired safe puncture area for performing tympanocentesis. A third training material can be disposed within the training areas of a bottom member of the cartridge. If the first training material has been withdrawn the user has successfully positioned the needle into the correct area of the simulated ear, evidencing a proper tympanocentesis procedure. If the second training material has been withdrawn the user has punctured an undesired area. Regardless of whether the first or second training material was initially punctured, if the third training material is withdrawn the user has over punctured the area. Thus, the present invention trains the user in proper location and depth. Once all of the training areas of the cartridge have been used, it is replaced with a new cartridge.

15 Claims, 12 Drawing Sheets

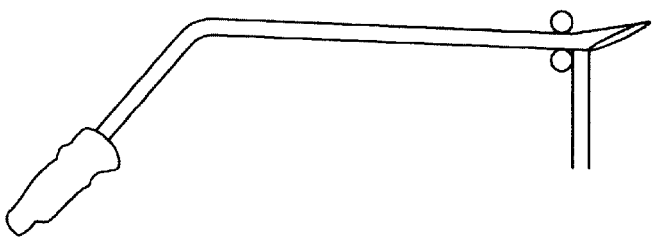
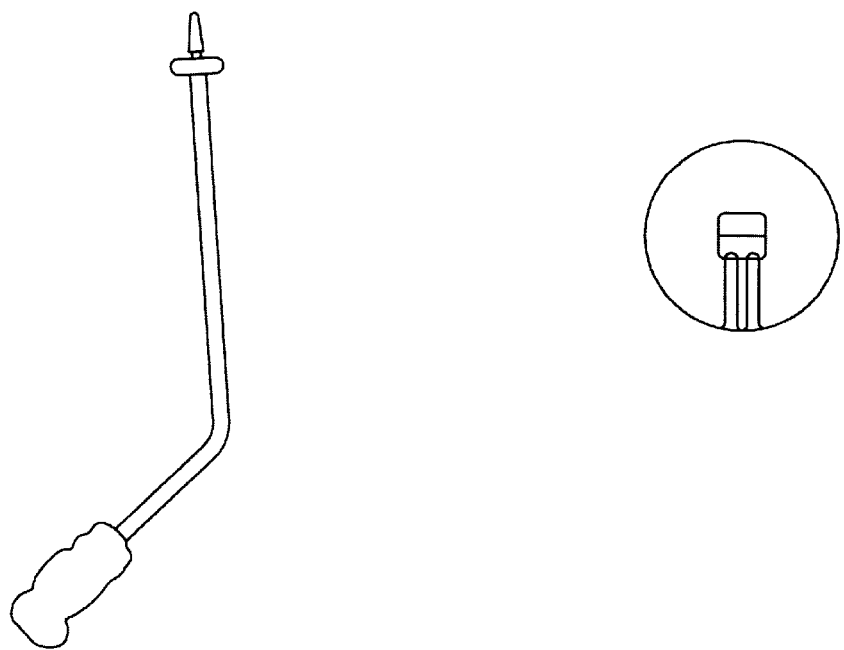
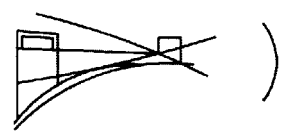
FIG. 12

TRAINING DEVICE PREFERABLY FOR IMPROVING A PHYSICIAN'S PERFORMANCE IN TYMPANOCENTESIS MEDICAL PROCEDURES

BACKGROUND OF THE INVENTION

1. Field of the Invention

The present invention relates generally to the medical training devices and particularly to a device preferably used for training physicians in the medical procedure of tympanocentesis for treating certain child ear infections.

2. Description of the Prior Art

Currently physicians are looking for alternative ways for diagnosing and/or treating children effected with an otitis-causing organism, in addition to prescribing an antibiotic. One alternative method is to tap the child's eardrum with a needle at the physician's office for both diagnosis and therapeutic purposes. This tapping method is referred to as tympanocentesis. However, great skill and precision is required to properly perform tympanocentesis. If the needle is not inserted within a relatively small area of the eardrum there is the chance of injury to the child. As most physicians have not included tympanocentesis as part in their daily practice, many fail to possess the skill and precision to properly perform the procedure in their office on a practically error free basis. As such, physicians/pediatricians need to be trained in the procedure prior to incorporating such procedure in their practices. Currently, no practice or training devices exist, which provide realistic conditions, for the physician/pediatrician to obtain proper training.

Tympanocentesis is a surgical procedure characterized by inserting a needle through the tympanic membrane (ear drum) followed by removal of fluid (usually pus). Access to the tympanic membrane is gained through the external auditory canal (ear canal). Visualization of the tympanic membrane through the ear canal requires adequate illumination and magnification for identification of anatomical landmarks prior to insertion of the needle, tympanocentesis is a term often used synonymously with myringotomy. The difference between the two procedures relates to whether a whole is left upon withdrawal of he needle (a tympanocentesis procedure) or a small cut is made in the ear drum after withdrawal of the tympanocentesis needle (a myringotomy).

Tympanocentesis/myringotomy has been a procedure practiced for over a millennia by physicians. In the pre-antibiotic era, it was commonplace for physicians to lance the ear drum in order to relieve the pressure of an acute inflammation of the middle ear space. This provided instantaneous pain relief, drainage of the pus and generally hastened a resolution of the infection. With the advent of antibiotics and their increased availability, the tympanocentesis/myringotomy procedure was used less frequently, particularly as broad spectrum antibiotics became available. Today tympanocentesis is most frequently undertaken by otolaryngologists, although an increasing number of primary care physicians (pediatricians, family physicians and general medicine internists) are finding tympanocentesis a useful diagnostic and therapeutic adjunct in the management of acute otitis media (middle ear infections).

The purpose of tympanocentesis is multifold: (1) immediate relief of pain from a bulging tympanic membrane under pressure from middle ear inflammation; infection induced by predominantly bacterial pathogens; (2) withdrawal of infected middle ear fluid allows for precise identification of the causative pathogens thereby allowing directed antibiotic therapy; (3) withdrawal of the infected fluid enhances the opportunity for an effective immune response since a substantial burden of the microbial pathogens is removed through suction of the infected material; (4) elimination of the hydrostatic force of the infectious process allows for improved ingress of host immune factors (antibodies, etc.) and allows better ingress of antibiotic therapies; (5) removal of the infected pus material also allows more rapid resolution of the inflammatory process including the thickening of middle ear mucosa, over production by mucus cells and ongoing inflammation of the eustachian tube (which normally functions to allow equilibration of ambient air with the middle ear space).

All tympanocentesis devices have in common the insertion of a needle through the tympanic membrane with access via the auditory canal. Sources of illumination and magnification vary. Needle devices vary. In all cases, the tympanocentesis needle is inserted through the tympanic membrane and then suction applied to remove a portion of the infected middle ear fluid. What is needed is a device for improving the safety of the tympanocentesis procedure for the patient. Currently, the procedure has (1) no device which optimizes stabilization of the needle, (2) provides a guide for appropriate insertion location for the needle or (3) provides the operator with an indicator of when the tympanocentesis needle has been inserted to a proper depth through the ear drum to insure adequate suction but not over penetration whereby middle ear bone or mucosa might be inadvertently traumatized.

It is therefore, to the effective resolution of the shortcomings of the prior art that the present invention is directed.

SUMMARY OF THE INVENTION

The present invention provides a device used for training hysicians in the medical procedure of tympanocentesis for treating certain child ear infections. An outer member of the training device preferably resembles a side profile of a small child's head and shoulder area, though such is not limiting. The outer member is preferably attached to a surface portion to define a receiving area for receiving a slidable inner member. A replica of at least an eardrum and ear canal of a child's inner ear is associated with the sliding inner member. Sliding inner member includes a transporting locking member, an "in use" locking member, and a training member.

The transporting locking member prevents any significant movement of the slidable inner member with respect to the outer member. The "in use" locking allows the inner member to travel a necessary distance to properly use the training device, but prevents the inner member from becoming separated from the outer member which could damage the inner member. The training member supports a simulated inner ear, positions the simulated inner ear to a desired position adjacent the outer ear of the outer member, and acts as a holder for the training cartridges used with the training device.

The training cartridges act as changeable tympanic membrane inserts to simulate the "look and feel" of popping through the tympanic membrane. Each cartridge includes a top member and a bottom member. The cartridges include one or more training areas. Preferably, two separate or distinct training materials (particularly in color) are disposed and maintained within each training area of the top member. The first training material represents the safest area for performing tympanocentesis, and is the desired area for puncture by a needle of a syringe by the trainer or user. The second training material represents an undesired area for puncture by the needle by the trainer or user. A third training material can be disposed within the training areas of the bottom member of the cartridge. Preferably, the third training material is separate or distinct from the first and second training materials (particularly in color). The third training material represents that a trainer in tympanocentesis procedures has inserted his or her needle too deep. The training areas of the top member of the cartridge are preferably aligned with corresponded training areas of the bottom member of the training cartridge. Air bubbles can also be injected into one or more of the training materials to more simulate a typical ear infection.

When using the present invention, to achieve optimal training, it is preferred that the training area of the present invention resemble or simulate at least an average child's inner ear in both shape, location and texture (feel). In this regard, the simulated inner ear and the training areas of the cartridges, are preferably constructed from materials to resemble an inner ear's texture. Also to this feature, the training member preferably positions the simulated inner ear and attached training cartridge in a similar location as an average child's inner ear's, such as an average two year old child. Furthermore, the depths of both the top member and the bottom member of the training cartridge are preferably chosen to correspond to similar areas of an average child's inner ear.

When using the present invention the user inserts the speculum, of a conventional otoscope having an operative head, into an the aperture of the simulated ear on the outer member. With the otoscope, the user sees the training materials located in the top member of the training cartridge. The user then inserts a conventional needle with a syringe attached, through the speculum attached to the otoscope. Preferably, the needle is bent, so that the syringe does not interfere with the user's view inside the simulated ear.

The needle when inserted into the simulated ear, will either puncture the top member of the training cartridge at the location of the first training material or the second training material and possibly also the third training material. Once punctured the user aspirates the training material punctured through the needle portion of the syringe and preferably into the syringe. If the first training material has been withdrawn the user has successfully positioned the needle portion into the correct area of the simulated ear, signaling a proper tympanocentesis procedure has been performed. If the second training material has been withdrawn the user has punctured an undesired area, which if an actual child's ear had been used, could possibly cause damage to the child. Regardless of whether the first or second training material was initially punctured, if the third training material is withdrawn the user has over punctured the area, which could also cause injury or bleeding if the procedure had been performed on an actual child. Thus, the present invention trains the user in both location and depth for performing a proper tympanocentesis procedure.

Once a training area of the cartridge has been punctured, the user rotates the training cartridge to the next training area. Once all of the training areas of a cartridge have been used (punctured), the cartridge is preferably removed, and a new cartridge is attached.

Accordingly, it is an object of the present invention to provide a device for training individuals in medical procedures such as tympanocentesis.

It is another object of the present invention to provide a training device which incorporates a disposable or removable cartridge, thus, allowing a single training device to be used by many different trainers.

It is still another object of the present invention to provide a tympanocentesis training device which is easy to use.

In accordance with these and other objects which will become apparent hereinafter, the instant invention will now be described with particular reference to the accompanying drawings.

BRIEF DESCRIPTION OF THE DRAWINGS

The invention may be better understood by reference to the drawings in which:

FIGS. 11 and 12 illustrate various embodiments for a stop member which is attached to a needle used in tympanocentesis procedures;

DESCRIPTION OF THE PREFERRED EMBODIMENTS

Figure 1:
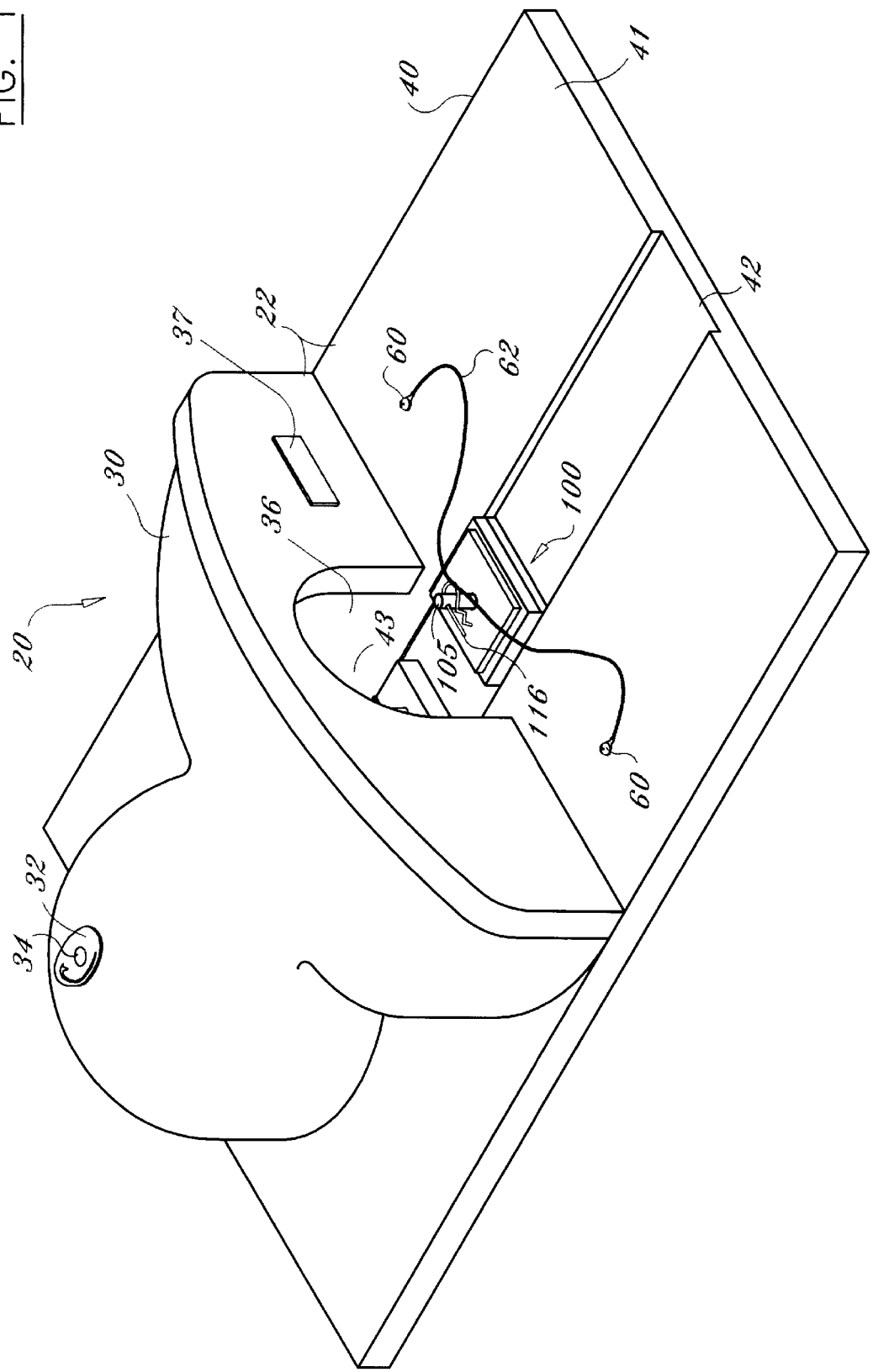
FIG. 1 is a perspective view of the present invention training device shown in its preferred transportable configuration.

As best illustrated in FIGS. 1 through 7, the present invention training device is illustrated and generally designated training device 20. Preferably, training device 20 is used in training physicians in the medical procedure of tympanocentesis. However, the present invention is not considered limited to tympanocentesis procedures, and other training procedures can also be incorporated and are also considered within the scope of the present invention. Furthermore, device 20 is also not limited to training by physicians, and other medical personal or other individuals can be trained in tympanocentesis procedures, as well as other procedures, by the present invention.

Training device 20 includes an outer portion 22 generally consisting of an outer body member 30 disposed on top of a bottom member 40, which is preferably substantially planar, though such is not considered limiting. Preferably, though again not limiting, body member 30 resembles a side profile of an individual or child's head and shoulders area. Body member 30 includes an ear member 34, preferably, though not limiting, resembling the shape of a child's ear. Ear member 34 includes an aperture for providing access to an area 43 defined by outer body member 30 and bottom member 40. Body member 30 can be removably or permanently attached to bottom member 40. Additionally, body member 30 and bottom member 40 can be constructed integral. Body member 30 and bottom member 40 can be preferably constructed from a substantially rigid material, such as plastic, wood, metal, etc. It should also be understood that the material used to construct body member 30 does not have to be the same material used to construct bottom member 40.

An identification member 37, such as a label, can be attached to an area of outer portion 22, and is illustrated as being attached to body member 30. Access to area 43 is also provided by an opening 36, preferably disposed at one end of body member 30.

Bottom member 40 includes an upper surface 41 and is provided with an elongated channel 42, which is aligned with opening 36. Preferably, the width of channel 42 is at least slightly smaller than the lower width of opening 36, to allow a slidable inner member 100 which slides within channel 42, discussed in detail below, to be inserted through opening 36 into area 43.

Figure 5:
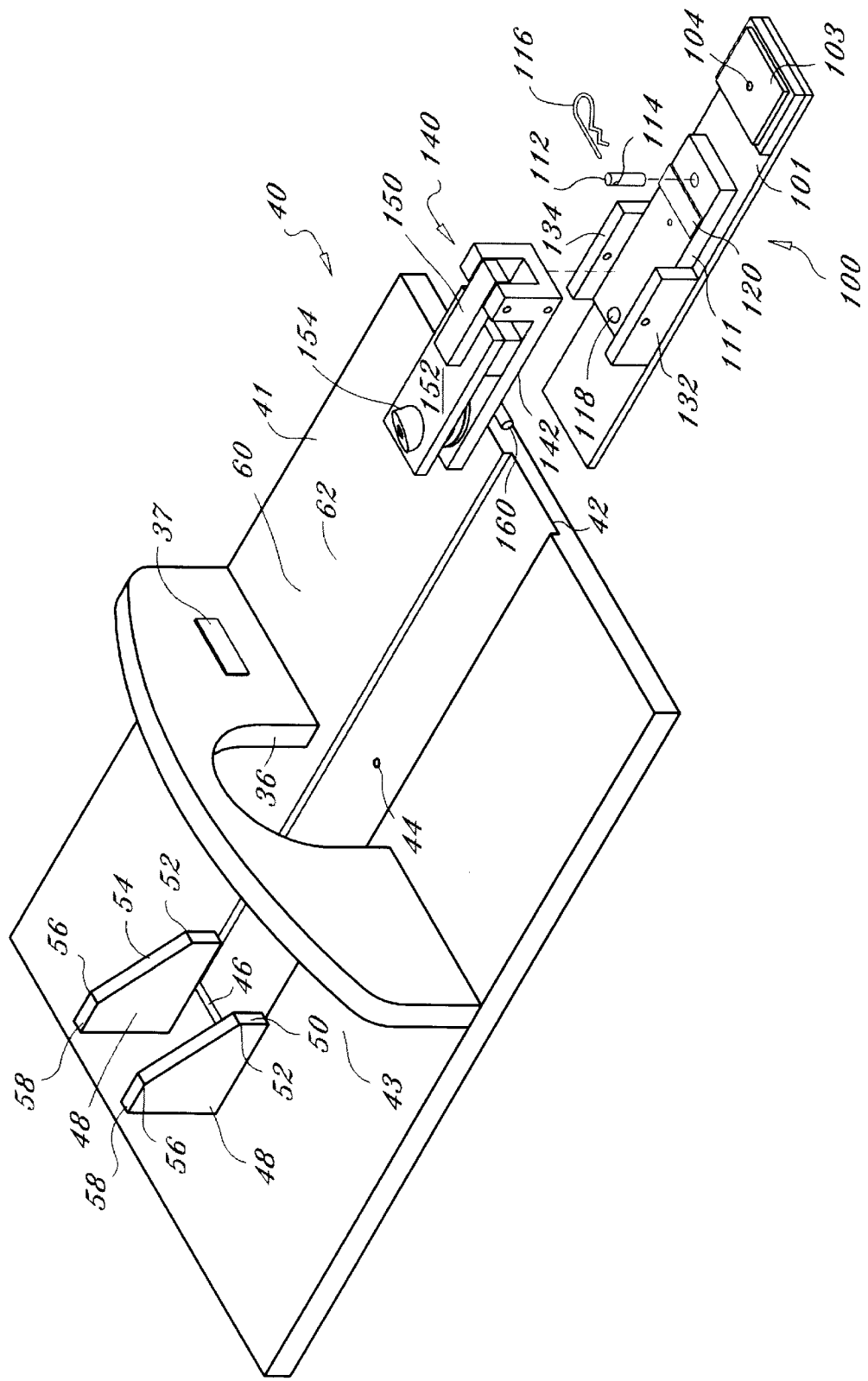
FIG. 5 is an exploded perspective view of the invention illustrated in FIG. 1 with a portion of an outer member removed.

As best seen in FIG. 5, a pair of ramp members 48 are disposed on upper surface 41 of bottom member 40 at an inner end of channel 42. Each ramp member 48 preferably includes a vertical surface 50, lower angle point 52, angled surface 54, top angle point 56 and horizontal surface 58. Ramp members 48 can be either removably or permanently attached to bottom member 40, and can also be constructed integral therewith. The function of ramp members 48 as positioning members will be discussed below in detail. A locking aperture 44 is also disposed through bottom member 40 and is communication with channel 42.

Figure 3:
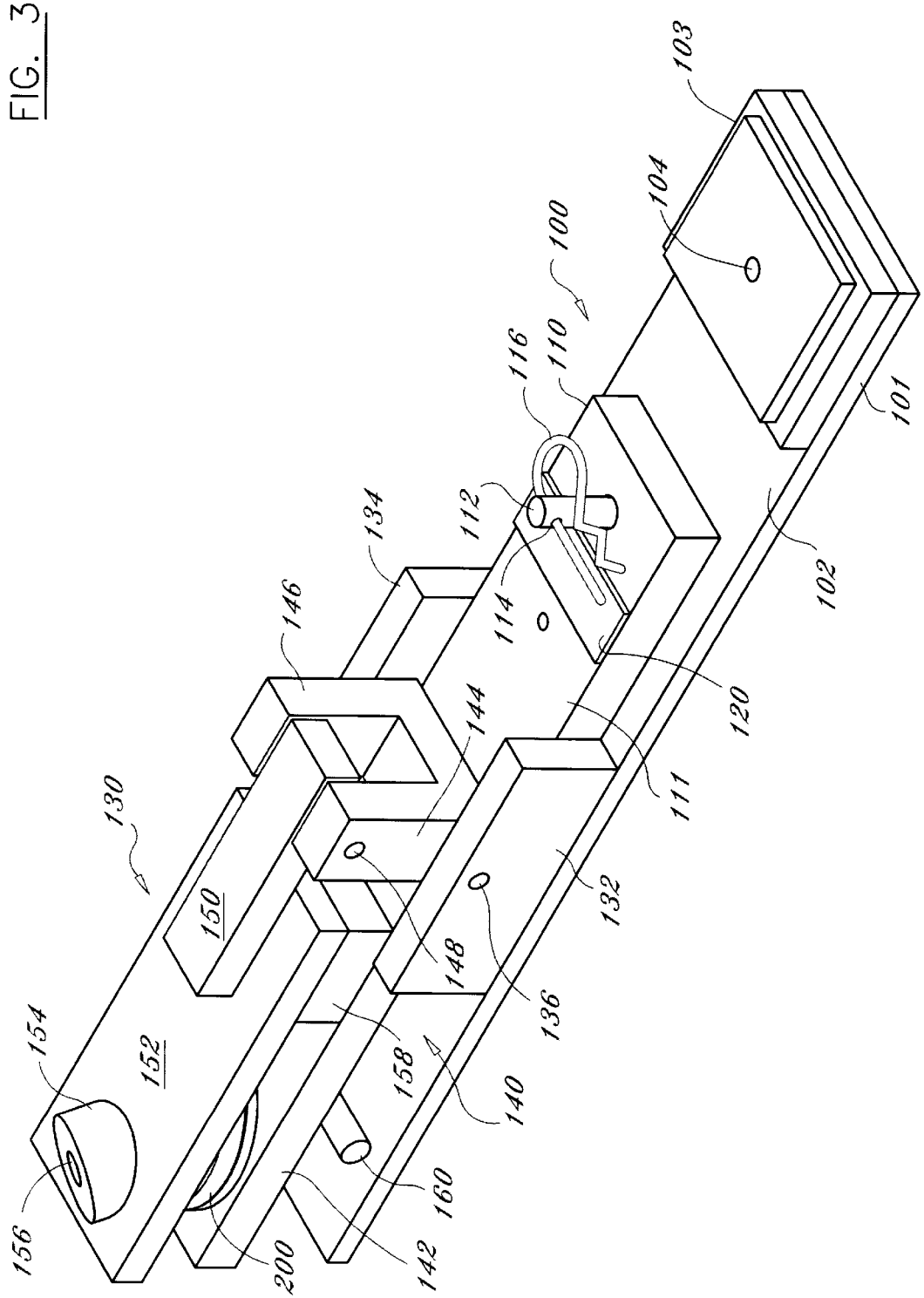
FIG. 3 is a perspective view of the slidable inner member of the invention illustrated in FIG. 1 with its training area in a closed position.
Figure 4:
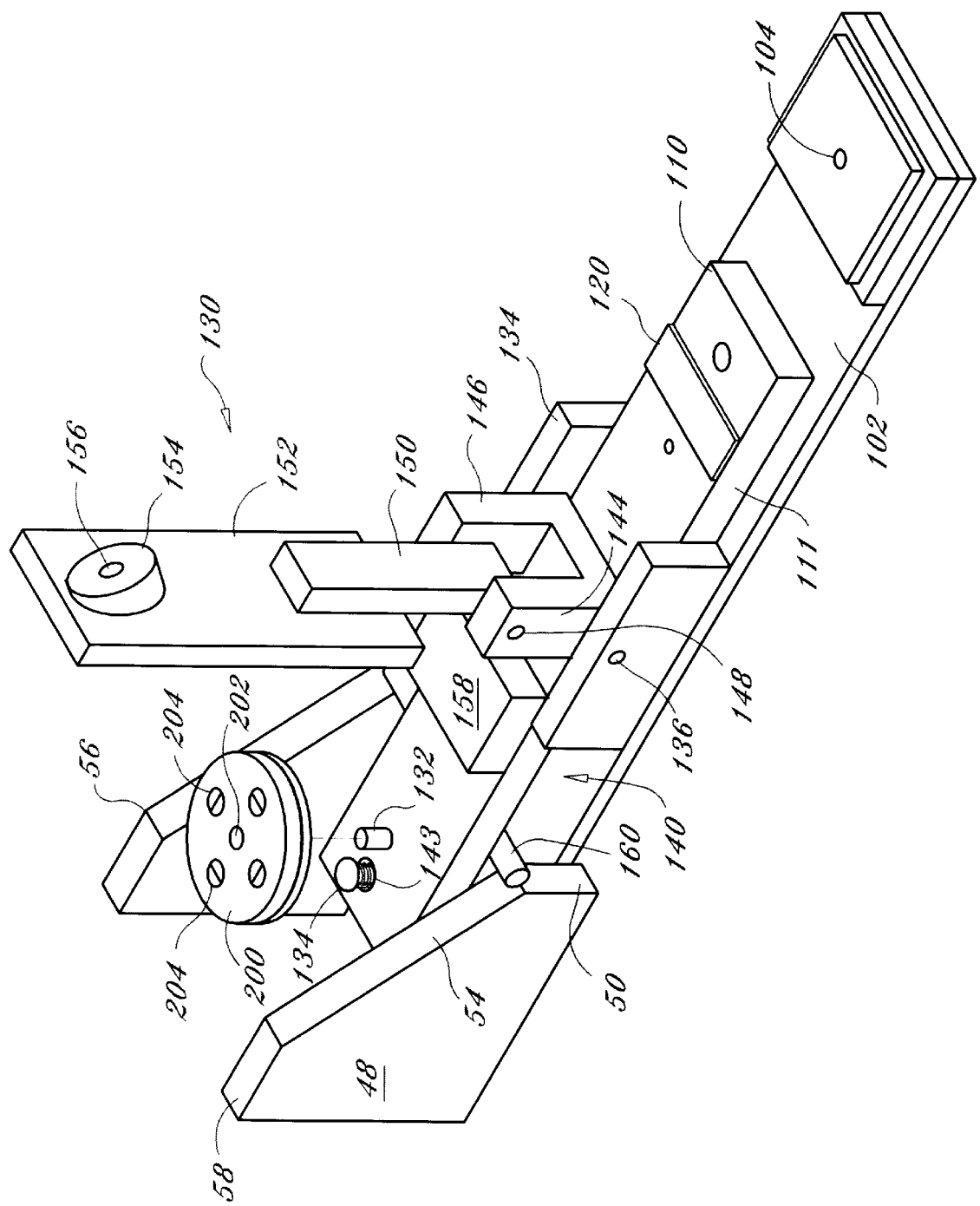
FIG. 4 is a perspective view of the slidable inner member of FIG. 3 having its training area in an open position for receipt and placement of a training cartridge in accordance with the present invention.

As best seen in FIGS. 3 and 4 the slidable inner member of training device 20 is illustrated and generally designated as inner member 20. Inner member 20 includes an elongated body member 101, which is preferably substantially planar. A transporting locking member 103, an "in use" locking member 110, and a training member 130 are all preferably associated with a top surface 102 of body member 101.

Transporting locking member 103 can extend upward from body member 101, as illustrated, or can consist of a portion of body member 101. An aperture 104 extends through locking member 103 for insertion of a locking bolt 105 (FIG. 1). Locking bolt 105 includes an aperture 107. When transporting device 20, to prevent movement of inner member 100, aperture 104 is aligned with aperture 44 of bottom member, preferably by sliding inner member 100 to the inner end of channel 42, and locking bolt is inserted through apertures 44 and 104. The head of locking bolt 105 is preferably larger in diameter than the diameter of apertures 44 and 104, and acts as a stop member, preferably at the underside of training device 20, once bolt 105 is properly inserted. When properly inserted, aperture 107 of bolt 105 is exposed on the opposite side of training device 20 from the bolt head (i.e. top side). A pin 116 is inserted through aperture 107. Thus, the combination of pin 116 at one side and the bolt head at the opposite side prevent locking bolt 105 from falling out of its locking position within apertures 44 and 104 which prevents any significant movement of inner member 100 with respect to outer member 22.

"In use" locking member 110, can include a first portion of elongated member 111 extending upward from body member 101, as illustrated, or can consist of a portion of body member 101. Locking member 110 also includes a post 112 permanently or removably attached to the first portion of body member 110, and preferably extending upward therefrom. Where post 112 is removably attached a cavity can be provided in the first portion of elongated member 111. Post includes an aperture 114. One or more cords 62, wires, cable, rope, string, etc. are attached, by conventional means, to outer member 22, such as at location 60 on bottom member 40. A pin, such as pin 116 discussed above, which is either permanently or removable attached to cord(s) 62, is inserted through aperture 114. The length of cord(s) 62 allows inner member to travel its necessary distance to properly use training device 20. Thus, the combination of pin 116 and cord(s) 62 prevents moving/sliding inner member 100 from its position within channel 42, when training device 20 is in use. If pin 116 is use as the pin for both transporting and using training device 20, it can be attached to cord(s) 62 for both purposes.

In one embodiment, training member 130 can include a pair of wall members 132 and 134 attached to or associated with body member 101 and preferably disposed at each side of elongated member 111. A cartridge positioning member 142 is rotatably connected wall members 132 and 134 preferably at location 136. Cartridge positioning member 142 can include upper side walls 144 and 148 extending upward therefrom. A positioning block 158 can be disposed on, and preferably attached to, an upper surface of cartridge positioning member 142. A positioning tab 118 can be disposed on, and preferably attached to, an upper surface of elongated member 111 for cartridge positioning member 142.

A first end of a connector 150 can be rotatably attached to side walls 144 and 146 preferably at location 148. A second end of connector 150 is preferably attached to an simulated inner ear support 152. Ear support 152 can be substantially planar. A simulated inner ear 154, having an aperture 156, is attached to a first top surface of ear support 152. Aperture 156 is in communication and aligned with an aperture extending through support 152.

A training cartridge receiving post 132 is disposed on, and preferably attached to, the upper surface of cartridge positioning member 142. Adjacent receiving post 132 is a cartridge bolt 134 which is retained within aperture 143 of cartridge positioning member 142 by its bolt head 135 and a nut 137. A tension spring 136 is disposed around the post portion of cartridge bolt 134, the purpose of which will be discussed below in conjunction with the discussion of a training cartridge 200 on receiving post 132. A positioning rod 160 is preferably attached to the bottom surface of first positioning.

Figure 8:
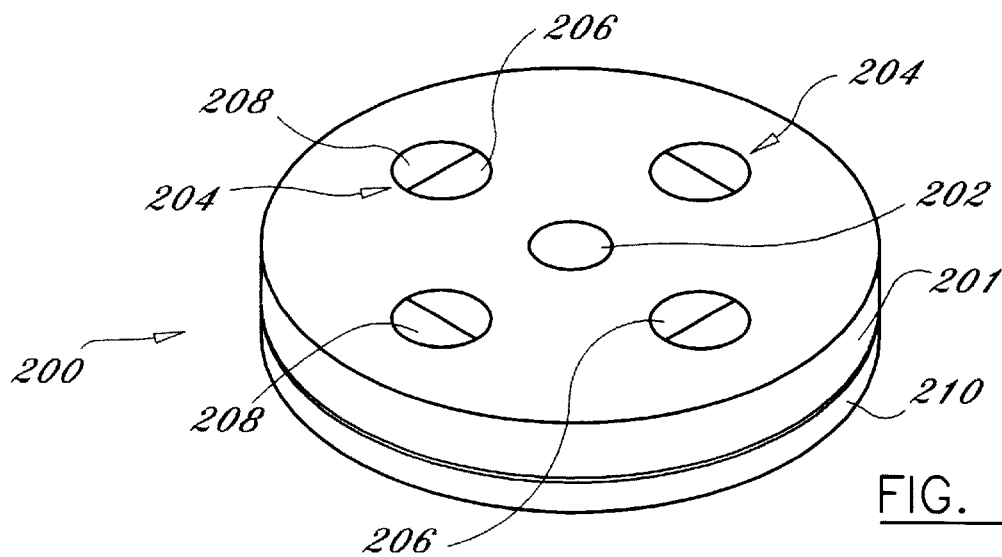
FIG. 8 is a top perspective view of the present invention training cartridge used with the present invention training device illustrated of FIG. 1.
Figure 9:
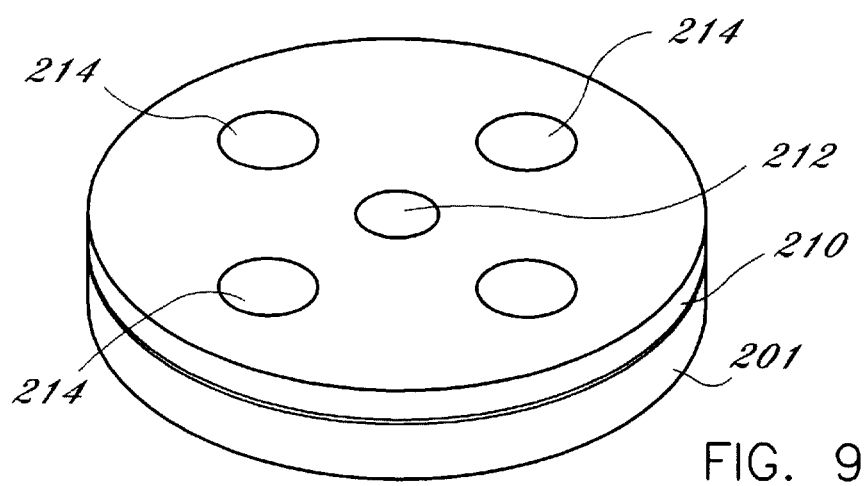
FIG. 9 s a bottom perspective view of the training cartridge of FIG. 8.
Figure 10:
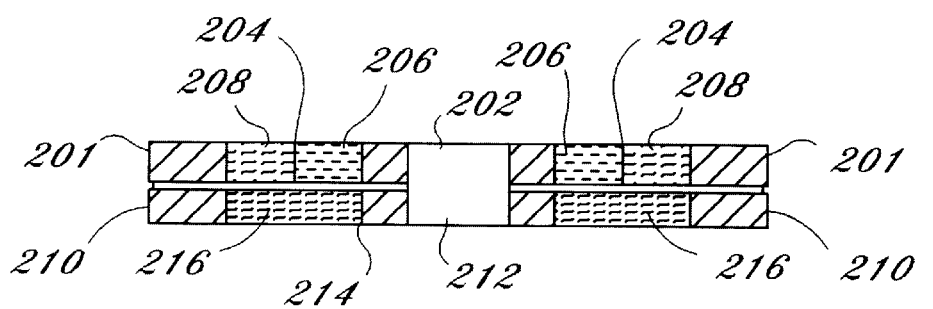
FIG. 10 is a side sectional view of the training cartridge of FIG. 8.

As best seen in FIGS. 8 through 10, a training cartridge 200 in accordance with the present invention is illustrated. Cartridge 200 acts as a changeable tympanic membrane insert and is preferably used to simulate the "look and feel" of popping through the tympanic membrane. Cartridge 200 includes a top member 201 and a bottom member 210. Cartridge top member 201 includes an aperture 202, preferably centrally located, and preferably four apertures 204, preferably spaced equally away from each other. The size/ circumference of each aperture (204 and/or 214) of cartridge 200 is preferably chosen to simulate the size/circumference of a tympanic membrane of a two year child. A transparent material, such as tape, film, wrap, etc. is preferably provided around the outer surface of cartridge top member 201, causing apertures 204 to become pockets or receptacles for receiving and holding training material(s). Preferably, two separate or distinct materials 206 and 208 (particularly in color) are disposed and maintained within each aperture 204. Though four apertures 204 are provided, such is not limiting, and other amounts of apertures 204 can be used. Material 206 in each aperture 204 represents the safest area for performing tympanocentesis, and is the desired area for puncture by a needle or syringe by the trainer or user. Material 208 in each aperture 204 represents an undesired area for puncture by the needle by the trainer or user. Training material 206 can be selected to resemble puss found in an actual ineffective ear.

Cartridge bottom member 210 includes an aperture 212, preferably centrally located, and preferably four apertures 214, preferably spaced equally away from each other. Aperture 212 is preferably aligned and in communication with aperture 202 of cartridge top member 201 to allow receiving post 132 to be inserted through both apertures 202 and 212 when cartridge 200 is placed upon cartridge positioning member 142. Similarly, the number of apertures 214, and their locations within bottom member 210, preferably correspond to the number and location of apertures 204. A transparent material, such as tape, film, wrap, etc. is preferably provided around the outer surface of cartridge bottom member 210, causing apertures 214 to become pockets or receptacles for receiving and holding training material 216. Preferably, training material 216 is separate or distinct from training materials 206 and 208 (particularly in color). Though four apertures 214 are provided, such is not limiting, and other amounts of apertures 214 can be used. Material 216 in each aperture 204 represents that a trainer in tympanocentesis procedures has inserted his or her needle or syringe too deep. In one embodiment, top member 201 is attached to bottom member 210 by conventional means, such as double sided tapes, adhesives, etc. Alternatively, top member 201 and bottom member 210 can be integrally constructed. Training cartridge can be constructed from many different rigid or semi-rigid materials, such as, but not limited to, plastics, wood, glass, metal, etc., all of which are considered within the scope of the invention.

Top training materials 206 and 208 and lower training material 216 can be injected or disposed within apertures 204 and 214, respectively, by drilling a hole in top member 201 and bottom member 210, respectively, which communicates with apertures 204 and 214, and disposing the training materials therein through corresponding holes. Preferably training material 206 is preferably inserted first so it ultimately resides inward, closer to aperture 202 (lower half of the aperture 204 being used for training when cartridge 200 is rotated by ramps 48 in the training position), as compared to training material 208 (which will be in the upper half of aperture 204 when rotated). Once the training materials have been disposed in their respective apertures 204 or 214, the drilled holes are plugged by a conventional material such as glue, putty, etc. Air bubbles can also be injected, when injecting or inserting materials 206, 208 and/or 216, to more simulate a typical ear infection. The rotation of cartridge 200 by ramps 48, allows cartridge 200 to form a positional/angular relationship with inner ear 154, which is preferably similar to the positional/angular relationship of an average two year old child.

As seen in FIG. 1, when transporting training device 20, slidable inner member 100 is disposed at a substantially innermost position within channel 42, which allows aperture 44 to align with aperture 104 for insertion of transportation bolt 105 through both apertures. Once transportation bolt 105 is inserted locking pin 116 is inserted through aperture 107 of bolt 105 which prevents transportation bolt 105 from falling out of its inserted position within apertures 44 and 104. The inserted position of transportation bolt 105 prevents inner member 100 from moving any significant amount, if any distance at all, when transporting device 20, thus, preventing inner member 100 from being damaged during transit.

When it is desired to use device 20 for training, or other purposes, pin 116 is removed from its position within aperture 107 of transportation bolt 105 allowing bolt 105 to be removed from its inserted position within apertures 44 and 104. Preferably, while training or using device 20, bolt 105 will be stored in a safe or recognizable location, so that it can be once again used for transportation purposes. A housing or other storage area/compartment on device 20, not shown, could be provided for such purposes.

Figure 2:
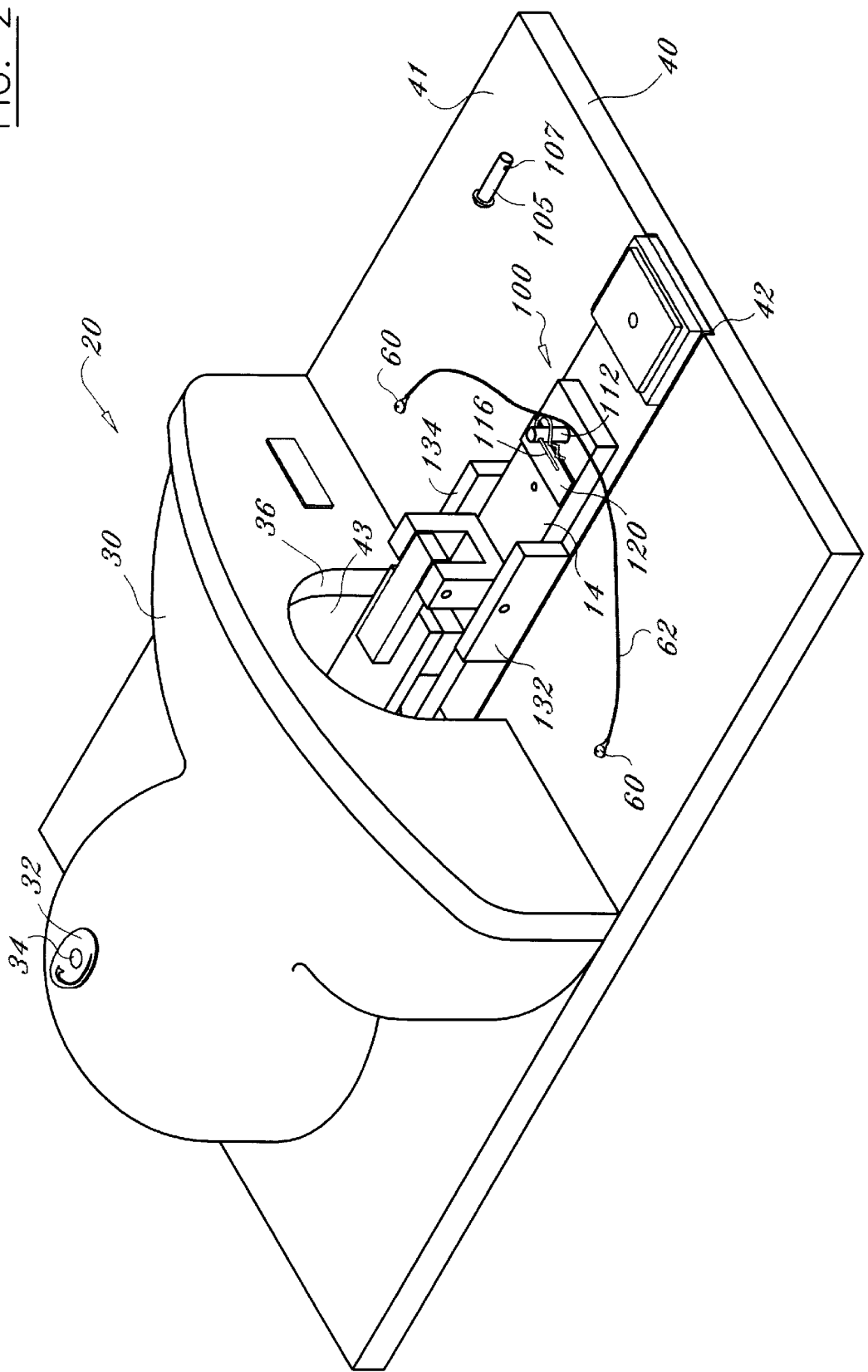
FIG. 2 is a perspective view of the present invention shown in its preferred operable configuration.

While in use, to prevent inner member 100 from being completely removed from channel 42, which could lead to damage of inner member 100, pin 116 is inserted through aperture 114 of post 112 (FIG. 2). The attachment of pin 116 to post 112, in conjunction with the attachment of cord(s) 62, restricts the distance inner member 100 is permitted to travel, while also positioning inner member 100 within channel 42 at all times during use.

When using device 20, to achieve optimal training, it is preferred that the training area of device 20 resemble or simulate at least an average child's inner ear in both shape, location and texture (feel). In this regard, simulated inner ear 154 and the training areas of cartridges 200, are preferably constructed from materials to simulate an inner ear's texture. Also to this feature, training area 130 in conjunction with ramps 48, preferably position simulated inner ear 154 and cartridge 200 in a similar location as an average child's inner ear's, such as an average two year old child. Furthermore, the depths of both top member 201 and bottom member 210 of cartridge 200 are preferably chosen to correspond to similar areas of an average child's inner ear.

In use, inner member 100 is initially withdrawn from area 43 to provide access to training area 130. Ear support 152 is rotated upwards (FIG. 4) to provide access to cartridge receiving post 132. A cartridge 200 is attached to cartridge positioning member 142 by the insertion of post 132 through apertures 202 and 212 of cartridge 200. Once properly attached, the position of cartridge 200 in conjunction with the tension of spring 136, causes bolt 134, at its bolt head 135, to press up on cartridge 200 at an aligned aperture/pocket 214 and the training material 216 disposed therein. The pressure on training material 216 is applied to corresponding training materials 206 and 208, causing materials 206 and 208, which are retained within aperture/pocket 204, to slightly bulge outward. This bulging effect resembles or simulates a typical infective ear with fluid to enhance the training received from device 20.

Once cartridge 200 is properly attached to receiving post 132, ear support 152 is rotated downwards (FIG. 3). Stop member 158 acts to position ear support 152 in its downward position, which aligns apertures 156 and 153 and with the preferably slightly bulging training area of cartridge 200. At this point, training portion 130 of inner member 100 is ready for insertion into area 43 defined by body member 30 and bottom member 40 of outer member 22. Insertion is preferably accomplished by sliding inner member 100 inward within channel.

Figure 6:
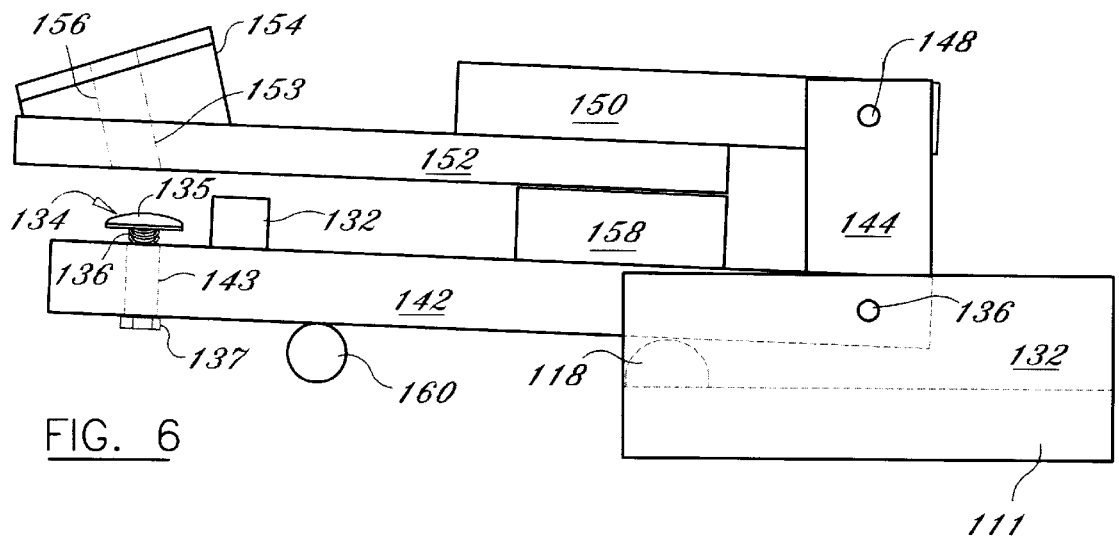
FIG. 6 is a side elevational view of the training area of the slidable inner member of FIG. 3 in a closed position.
Figure 7:
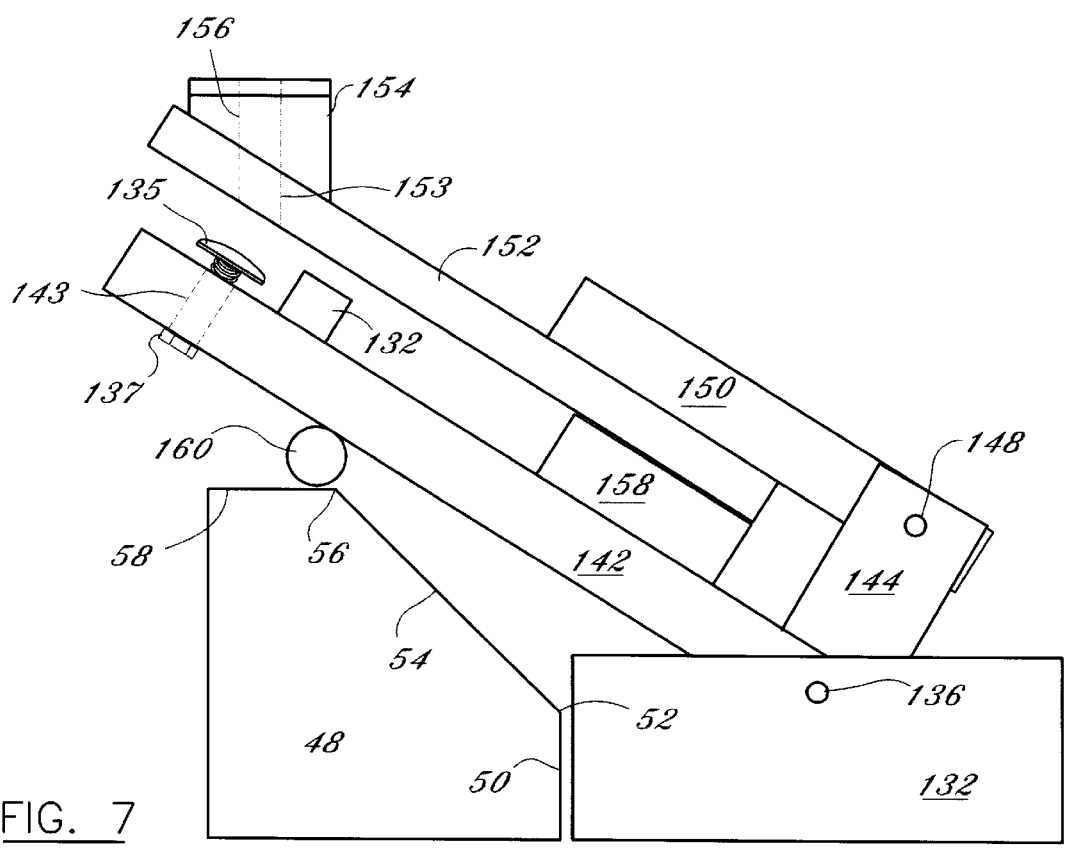
FIG. 7 is a side elevational view of the positioning relationship between the training area of the slidable inner member and the ramp members of the present invention.

To properly position simulated inner ear 154 while inner member is inserted, rod 160 meets ramps 48 preferably approximate first angle points 52. As best seen in FIG. 6, tab or stub 118 positions cartridge positioning member 142, and its attached rod 160, at a predetermined height prior, which is preferably approximate to the height of first angle points 52, to allow rod 160 easy access to angled surface 54. As inner member 100 is inserted within area 43, rod 160 is permitted to ride/travel along angled surface 54 by the pivoting of cartridge positioning member 142 at point 136. Inner member 100 is fully inserted when its inserted end of body member 101 reaches the closed end of channel 42, disposed within area 43, which acts as a stop member. At this point, rod 160 has preferably traveled to the top of ramps 48 (FIG. 7), or some other location that positions simulated inner ear 154 adjacent outer ear 32 to correspond to the positional relationship between a child's inner ear position and outer ear position, such as, though not limited to, an average two year child. At this point, device 20 is ready for use.

A user/trainer holding a conventional otoscope inserts the speculum of the otoscope into aperture 34 of simulated ear 32. The user, by conventionally using the otoscope, sees training materials 206 and 208 of cartridge 200. The user then inserts a conventional needle, through the speculum of the otoscope. Preferably, the needle is bent, so that the syringe does not interfere with the user's view inside the simulated ear.

The needle when inserted into the simulated ear, will either pierce/puncture cartridge 200 at the location of training material 206 or training material 208 and possibly also training material 216. Once punctured the user draws/aspirates the training material 206 or 208 and possibly 216 through the needle into the syringe. If training material 206 has been withdrawn the user has successfully positioned the needle portion into the correct area of the simulated ear, signaling a proper tympanocentesis procedure has been performed. If training material 208 has been withdrawn the user has punctured an undesired area, which if an actual child's ear had been used, could possibly cause damage to the child. Regardless of whether training material 206 or 208 was initially punctured, if training material 216 is withdrawn the user has over punctured the area, which could also cause injury or bleeding if the procedure had been performed on an actual child. Thus, device 20 trains the user in both location and depth for performing a proper tympanocentesis procedure, as well as the feel of going through the tympanic membrane/eardrum.

Once a training area of cartridge 200 has been punctured, the user, preferably after withdrawing the needle and otoscope, can remove or withdraw inner member 100 from its inserted position within area 43 to expose training area 130. The user or other individual then rotates ear support 152 upward to allow access to cartridge 200. The next training area on cartridge 200 is then aligned with bolt head 135, as described above, and device 20 is made ready for training, as also previously described above. Once all of the training areas of a cartridge have been used (punctured), the cartridge is preferably removed, and a new cartridge 200 is disposed on receiving post 132 as described above.

The present invention is not considered limited to the structure disclosed herein for positioning cartridge 200 and inner ear 154. Other structures which position cartridge 200 and inner ear 154 to their desired positions with respect to outer ear 32 can be used and are considered within the scope of the invention. Training materials 206, 208 and/or 216 are not limited to any one specific material, and various materials, compositions, fluids, liquids, etc. can be used as training materials and all are considered within the scope of the invention.

An identification label, plate, plaque, etc. 120 can be attached or associated with inner member 100 or member 110 and can include indicia which corresponds or relates to indicia associated with label, plate, plaque, etc. 37 attached to outer body member 22.

The present invention training device 20 is ideal for use by pediatricians, family physicians, emergency care physicians, general internists, otolaryngologists, nurse practitioners, physician assistants and audiologists. However, this list is not exhaustive nor considered limiting.

Figure 11:
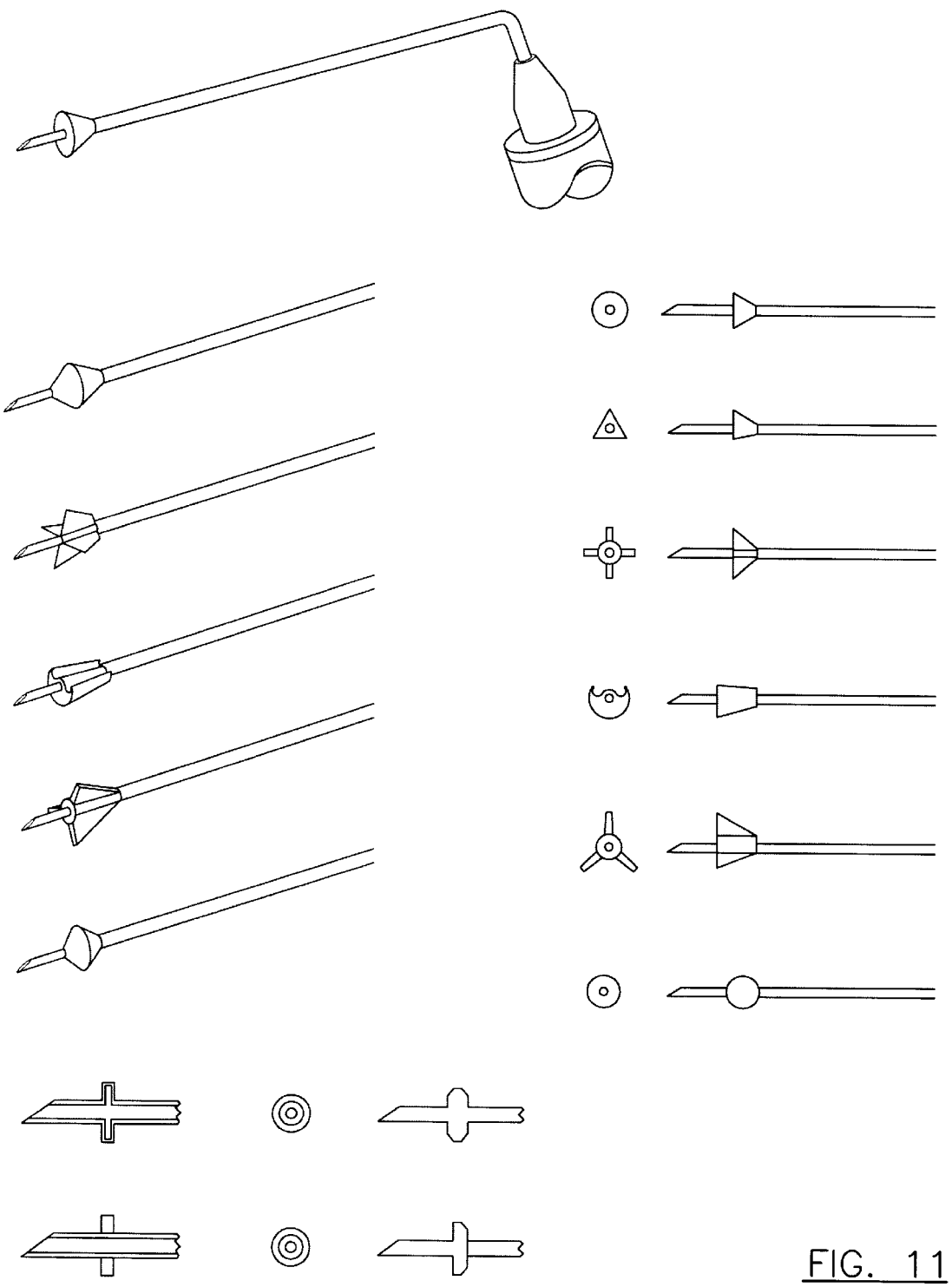

FIGS. 11 and 12 illustrate a stop member for use with a needle use for the tympanocentesis procedure. The needle stop gives a visual indication to the operator that the tympanocentesis needle has been inserted to a proper depth into the middle ear space. Inadequate penetration of the needle precludes adequate suction from being applied in order to evacuate the infected middle ear fluid. Over penetration of the needle permits the needle tip to strike the periosteum of the sphenoid bone thereby producing bleeding. Once the needle stop face makes contact with the ear drum surface, then the operator knows that the proper depth of needle insertion has occurred. Preferably, the needle stop is constructed from a clear, flexible material and acts as a safety stop by limiting the depth (penetration) of the needle in the tympanic membrane. The needle stop can be constructed similar to a clear plastic o-ring or washer.

Figure 13:
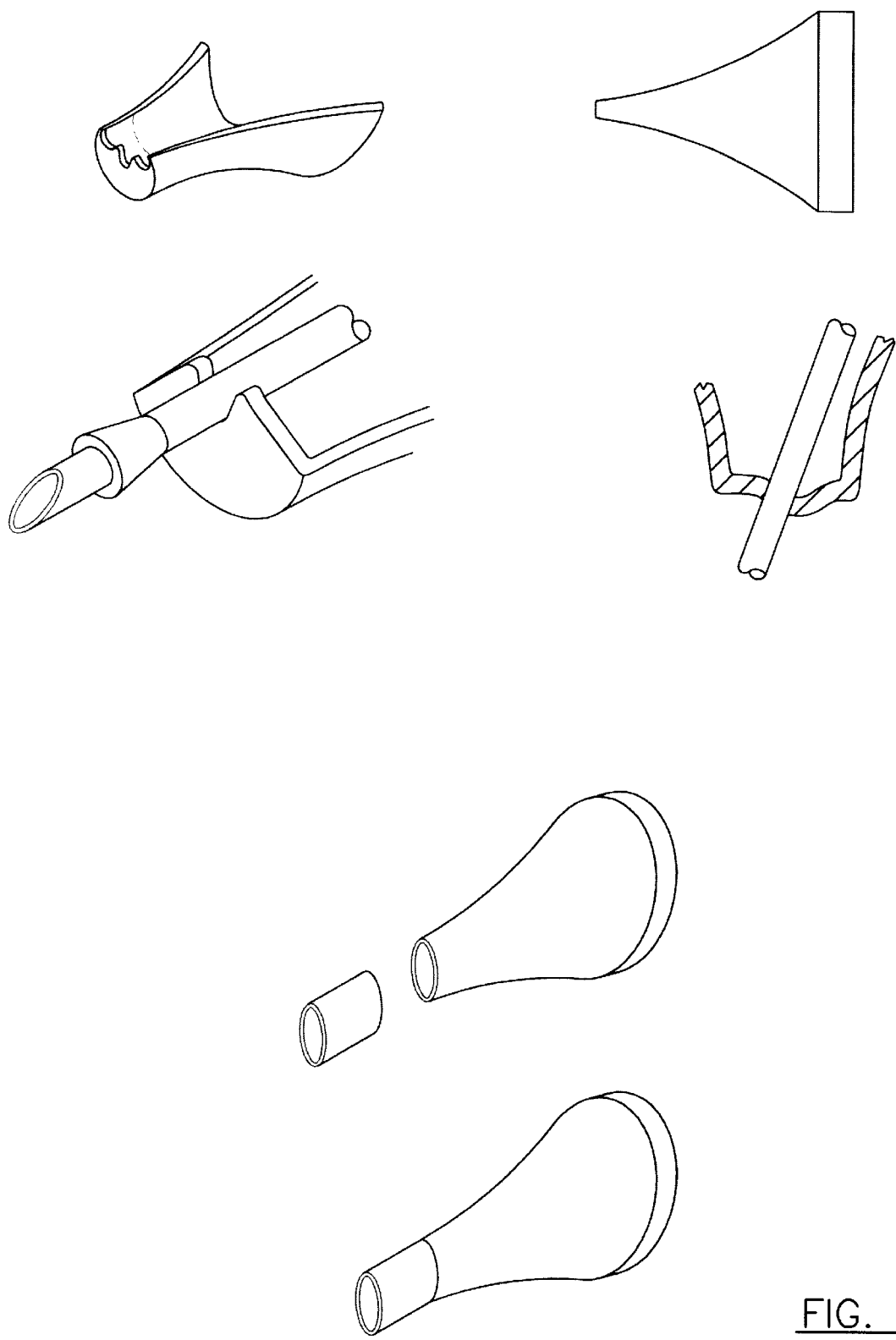
FIGS. 13 and 14 illustrate a stabilization channel for a speculum attached to a otoscope for use in tympanocentesis procedures.
Figure 14:
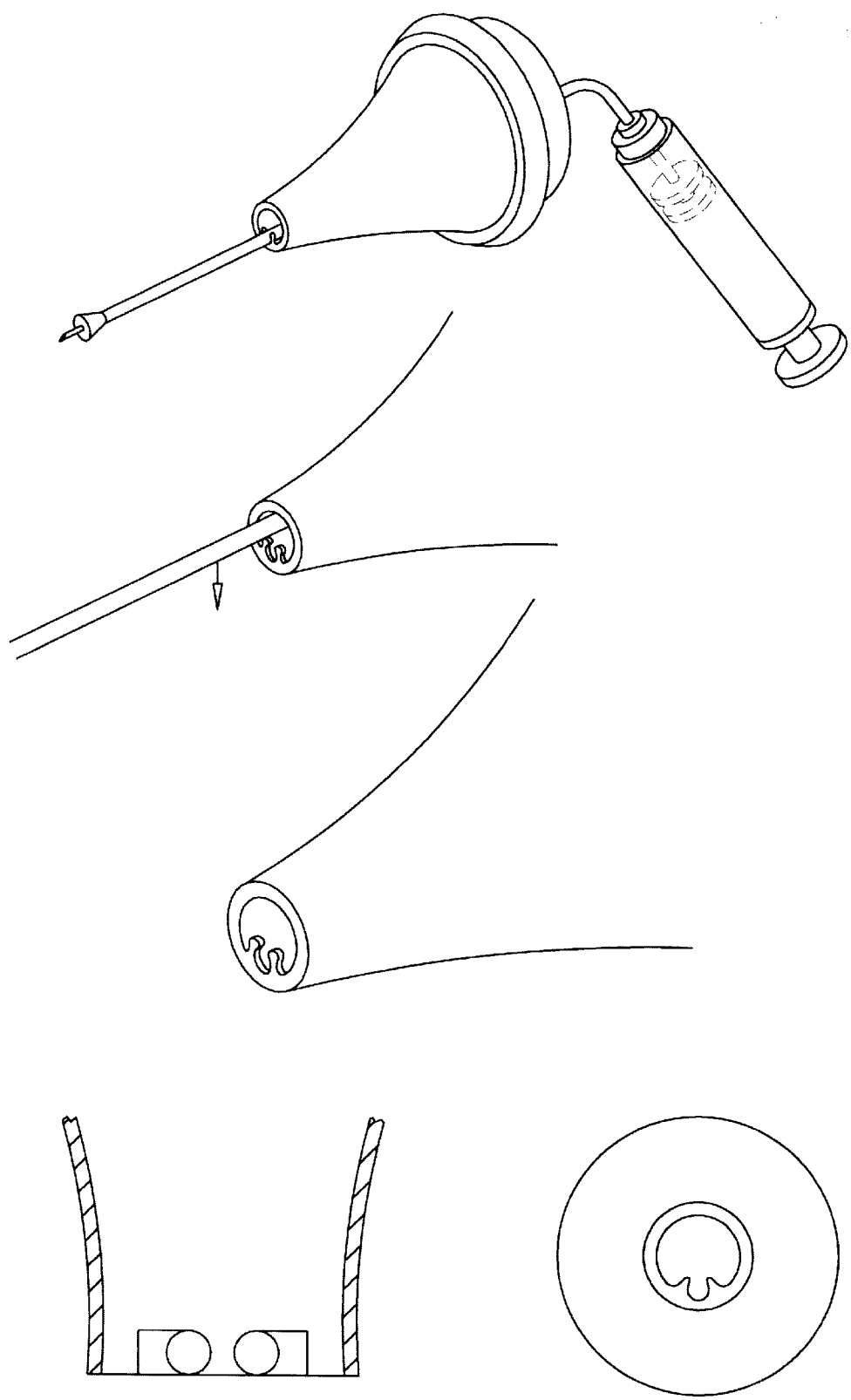

As seen in FIGS. 13 and 14 a stabilization channel for a speculum is illustrated. The stabilization channel acts as a needle guide. A theoretical danger in performing tympanocentesis relates to insertion of the tympanocentesis needle into the superior half of the ear drum. This is because in the superior half of the middle ear space, the three small middle ear bones (incus, malleus, stapes) are anatomically positioned. The guide provides stabilization for the tympanocentesis needle at the midpoint between the safety stop, if attached, and the hand of the operator. Excessive restriction at the speculum tip would interfere with appropriate positioning of the needle because there are variations in the shape and contour of the external auditory canal. Variability in length and shape also are of consequence as they vary with the age of the patient. This procedure may be performed in very young children through adulthood. The needle guide is located on an inner surface of the speculum, and preferably the needle can be snapped into a locked position by the structure of the needle guide.

Figure 15:
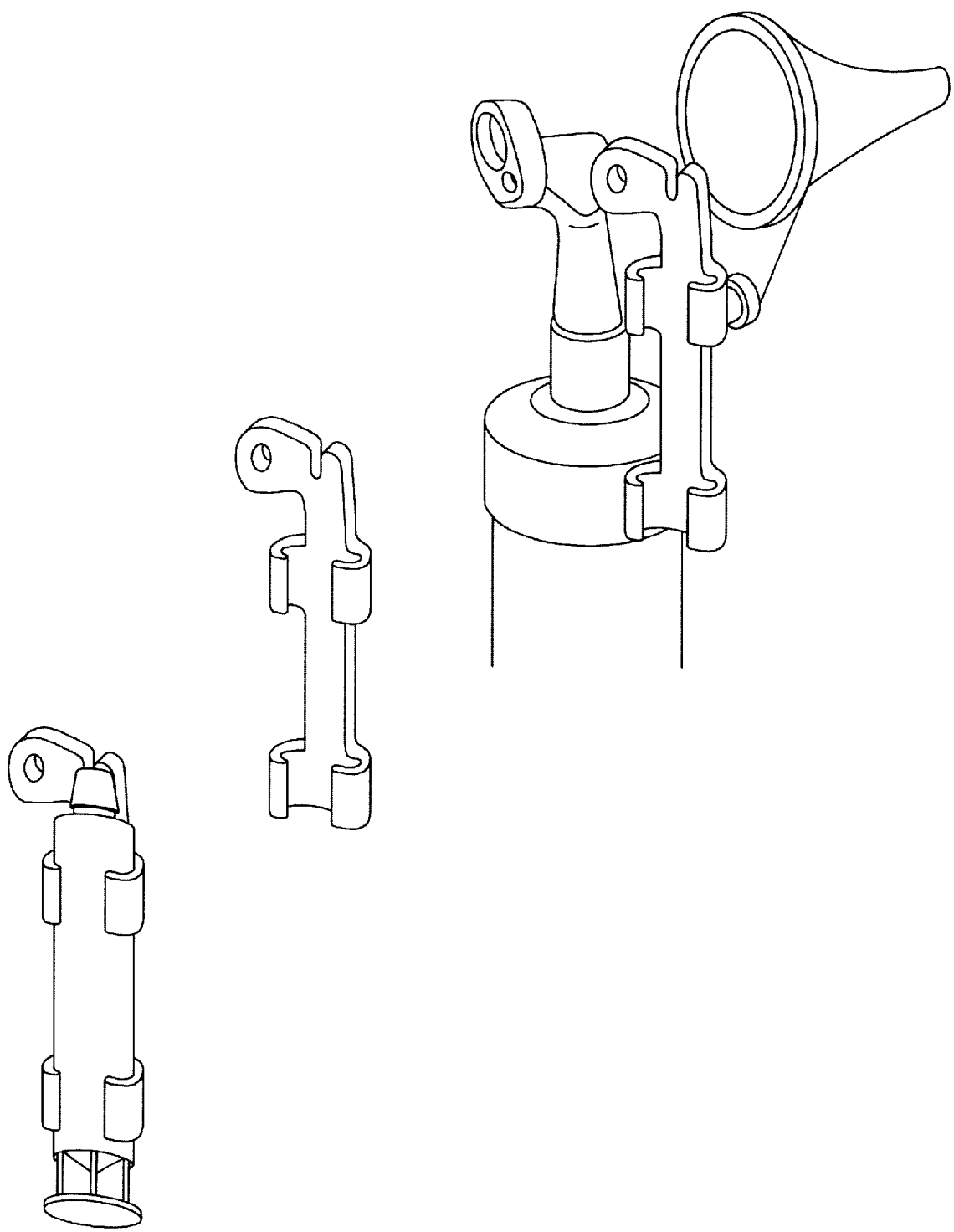
FIG. 15 illustrates perspective and exploded view of a combination needle guide and syringe holder in accordance with the present invention.

FIG. 15 illustrates a combination needle guide and syringe holder, which can include a stabilization ring. The stabilization ring is attached to the otoscope handle at a site distal to the speculum stabilization channel, if any. The use of the stabilization ring may be of benefit in selected patients depending upon the anatomy of the external auditory canal. The sleeve structure with connection to the otoscope illumination source allows for mobility to improve the positioning process. Thus, the user does not have to hold the syringe as it is clamped to the otoscope.

Additionally, the magnification and light of a conventional otoscope can be increased. The embodiments illustrated in FIGS. 11 through 15 can be used in training or actual tympanocentesis procedures.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A training device, comprising:
   an outer body member defining a receiving area, said outer body member including an aperture in communication with said receiving area;
   a simulated inner ear portion;
   means for positioning said simulated inner ear portion within said receiving area approximate to the aperture in said outer body member; and
   means for positioning a training cartridge within said receiving area.

2. The training device of claim 1 wherein said inner ear portion having an aperture extending therethrough and said means for positioning aligning the aperture of said inner ear portion with the aperture of said outer body member.

3. The training device of claim 1 further including means for maintaining said simulated inner ear portion within said receiving area during transit.

4. The training device of claim 1 wherein a portion of said outer body resembling a side profile of a human head and shoulder area.

5. The training device of claim 1 further including a training cartridge removably attached to said means for positioning a training cartridge, said training cartridge having at least one training area.

6. A training device preferably for improving a user's performance in tympanocentesis procedures, said training device comprising:
   an outer body member having a first portion and a second portion, said first portion resembling a side profile of at least a child's head area including a simulate outer ear and ear hole, said second portion including a channel defined within at least a segment of said second portion;
   an elongated inner member having a first end and a second end, said inner member disposed within said channel;
   a simulated inner ear member having an aperture extending therethrough;
   means for supporting said simulated inner ear member, said means for supporting rotatably associated with said elongated inner member approximate the first end of said elongated inner member, said means for supporting positioning said inner ear member adjacent the ear hole of said outer body member during use such that the ear hole is at least substantially aligned with the aperture of said simulated inner ear member;
   means for positioning said simulated inner ear member and supporting a training cartridge, said means for positioning said simulated inner ear member and supporting also positioning a supported training cartridge adjacent said means for supporting said simulated inner ear member during use such that a desired training area of said training cartridge is at least substantially aligned with the aperture of said simulated inner ear member.

7. The training device of claim 6 wherein said first portion and said second portion of said outer body member define an inner member receiving area, wherein a portion of said channel extending within said receiving area.

8. The training device of claim 6 further including means for maintaining said inner member in an inserted position with respect to said outer body member.

9. The training device of claim 8 wherein said means for maintaining comprises:
   a first aperture disposed through said channel;
   a second aperture disposed through said inner member approximate the second end of said inner member; and
   a bolt;
   wherein said bolt is inserted through said first aperture and said second aperture to maintain said inner member with respect to said outer body member.

10. The training device of claim 9 wherein said bolt having an aperture extending therethrough; said means for maintaining further including a pin member, said pin member inserted within an aperture of said bolt to prevent said bolt from being removed from its inserted position within the first aperture and said second aperture during the maintaining of said inner member in its inserted position with respect to said outer body member.

11. The training device of claim 6 further including means for restricting movement of said inner member outside of said channel.

12. The training device of claim 11 wherein said means for restricting comprises:
   a post member extending upward from an intermediate portion of said inner member, said post member having an aperture extending therethrough;
   at least one cord-like member having a certain length and attached to said inner member;
   a pin member attached to said at least one cord-like member, said pin member inserted within the aperture of said post member, wherein a distance of movement of said inner member within said channel is defined by the length of said at least one cord-like member.

13. The training device of claim 6 wherein said means for supporting said simulated inner ear member comprises:
   a substantially planar member having an aperture extending therethrough, said simulated inner ear member attached to said substantially planar member so that the aperture of said substantially planar member is aligned with the aperture of the simulated inner ear member when positioned by said means for positioning said simulated inner ear member;
   a first pair of wall members associated with said inner member, said substantially planar member rotatably associated with said first pair of wall members.

14. The training device of claim 7 wherein said means for positioning said simulated inner ear member and supporting a training cartridge comprises:

- a substantially planar member having a cartridge receiving post extending upward therefrom;
- a first pair of wall members associated with said inner member, said substantially planar member rotatably associated with said first pair of wall members;
- a rod attached to an underside of said substantially planar member;
- at least one ramp associated with said second portion of said outer body member, said at least one ramp disposed within said receiving area;
- wherein when positioning said simulated inner ear member with respect to the simulated ear hole in said outer body member said rod travels along an angled surface of said at least one ramp by moving said inner member inward within said receiving area;
- wherein when said first end of inner member reaches said receiving area end of said channel the aperture of said simulated inner ear member is aligned with the simulated ear hole.

15. The training device of claim 14 further including a bolt extending through substantially planar member adjacent the cartridge receiving post, said bolt applying tensioned pressure to a training cartridge attached to said receiving post.

\* \* \* \* \*